(12) United States Patent
Kanno

(10) Patent No.: US 6,325,046 B1
(45) Date of Patent: Dec. 4, 2001

(54) ENGINE CONTROL SYSTEM

(75) Inventor: Isao Kanno, Shizuoka (JP)

(73) Assignee: Sanshin Kogyo Kabushiki Kaisha (JP)

( * ) Notice: Subject to any disclaimer, the term of this patent is extended or adjusted under 35 U.S.C. 154(b) by 0 days.

(21) Appl. No.: 09/422,915

(22) Filed: Oct. 21, 1999

(30) Foreign Application Priority Data

Oct. 21, 1998 (JP) .................................................. 10-300217

(51) Int. Cl.$^7$ ................................. F02P 5/15; F02P 43/04
(52) U.S. Cl. ............................... 123/406.44; 123/406.45; 123/687; 123/703
(58) Field of Search ..................... 123/406.44, 406.45, 123/703, 679, 683, 687

(56) References Cited

U.S. PATENT DOCUMENTS

| | | | |
|---|---|---|---|
| 4,543,176 | * 9/1985 | Harada et al. ........................ 204/406 |
| 5,060,617 | 10/1991 | Kojima et al. ........................ 123/435 |
| 5,148,791 | * 9/1992 | Nagano et al. ............. 123/406.44 X |
| 5,215,068 | 6/1993 | Kato .................................... 123/676 |
| 5,448,975 | * 9/1995 | Sato .............................. 123/406.44 |
| 5,615,661 | 4/1997 | Suzuki ................................ 123/688 |
| 5,632,260 | 5/1997 | Kato .................................... 123/673 |
| 5,673,676 | 10/1997 | Mukumoto ........................... 123/673 |
| 5,713,339 | 2/1998 | Kishida et al. ...................... 123/676 |
| 5,727,536 | 3/1998 | Kato .................................... 123/682 |
| 5,762,053 | 6/1998 | Anamoto .............................. 123/674 |
| 5,769,053 | * 6/1998 | Nonaka ........................... 123/406.44 |
| 5,775,311 | 7/1998 | Kato et al. ........................... 123/681 |
| 5,778,857 | 7/1998 | Nakamura et al. ............. 123/406.37 |
| 5,809,967 | * 9/1998 | Masubuchi ...................... 123/406.44 |
| 5,813,390 | 9/1998 | Anamoto .............................. 123/674 |
| 5,816,218 | 10/1998 | Motose ................................ 123/479 |
| 5,829,402 | * 11/1998 | Takahashi et al. ............. 123/184.24 |
| 5,887,570 | * 3/1999 | Suzuki et al. .................. 123/406.44 |
| 5,918,584 | 7/1999 | Kato .................................... 123/681 |
| 5,941,223 | 8/1999 | Kato .................................... 123/679 |
| 6,006,705 | 12/1999 | Kato et al. ....................... 123/73 AD |
| 6,032,653 | 3/2000 | Anamoto .............................. 123/491 |

FOREIGN PATENT DOCUMENTS

| | | | |
|---|---|---|---|
| 61-98970 | * | 5/1986 | (JP) . |
| 63-105264 | * | 5/1988 | (JP) . |
| 2-153261 | * | 6/1990 | (JP) . |

* cited by examiner

Primary Examiner—Tony M. Argenbright
(74) Attorney, Agent, or Firm—Knobbe, Martens, Olson & Bear, LLP (57) ABSTRACT

An internal combustion engine includes an improved feedback control system and method for operating the engine to provide the desired air/fuel ratio under all running conditions without causing unsettling variations in engine speed and torque as adjustments to the air/fuel ratio are made. The feedback control operates to modify the fuel/air ratio from that achieved by a basic setting that is derived from parameters of engine performance so as to maintain the desired ratio. The control system also adjust the ignition timing while the air and fuel ratio is adjusted toward the desired ratio to maintain generally constant engine speed and torque.

32 Claims, 7 Drawing Sheets

ENGINE CONTROL SYSTEM

PRIORITY INFORMATION

This application is based on and claims priority to Japanese Patent Application No. 10-300217 filed Oct. 21, 1998, the entire contents of which is hereby expressly incorporated by reference.

BACKGROUND OF THE INVENTION

1. Field of the Invention

This invention relates to an engine feedback control system and method, and more particularly to such a system and method wherein the feedback control adjusts the air/fuel mixture of the engine.

2. Description of the Related Art

Various control methodology and systems have been employed in conjunction with internal combustion engines so as to improve their performance, particularly in the areas of fuel economy and exhaust emission control. One of the more effective types of controls is a so-called "feedback" control. With this type of control, a basic air/fuel ratio is set for the engine for given engine running parameters. The final adjustment in the air/fuel ratio is made from a sensor that senses the air/fuel ratio in the combustion chamber. Adjustments are then made from the basic setting in order to bring the air/fuel ratio into the desired range.

Normally, the type of sensor employed for such feedback controls is an oxygen ($O_2$) sensor. By determining the amount of oxygen in the exhaust gases from the combustion chamber, it is possible to fairly accurately measure the actual fuel ratio that was delivered to the combustion chamber.

The system operates on a feedback-control principle, continuously making corrections to accommodate deviations from the desired ratio. Adjustments are made in stepped intervals until the sensor output goes to the opposite sense from its previous signal. For example, if the mixture was running rich, then lean adjustments are made until the mixture strength is sensed to be lean. Adjustments are then made back into the rich direction in order to try to maintain the desired ratio.

These systems have the drawback that adjustments to the air/fuel ratio affect the power output of the engine differently depending on the air/fuel ratio at which the adjustment is made. For example, the same quantitative increase in the air/fuel ratio made to a lean air/fuel mixture as compared to a rich air/fuel mixture will decrease engine power by a greater degree. Adjustments which greatly affect engine power are generally undesirable.

When the air/fuel ratio of the engine shifts the engine torque and especially engine speed also fluctuate. This is particularly noticeable in engine employing lean or fast burn combustion chamber technology. Thus, even if an operator tries to keep a steady throttle position, the engine speed fluctuates. These fluctuations are undesirable as they give the operator an uneasy feeling.

SUMMARY OF THE INVENTION

The present invention related to an engine for an outboard motor in which engine speed and torque are keep relatively constant despite changes in an air/fuel ratio as the air/fuel ratio is adjusted. The engine comprises an oxygen sensor which detects a current air/fuel ratio and an engine speed sensor for detecting the engine speed. A throttle angle sensor detects the current position of the throttle and a control compares the current air/fuel ratio with a predetermined air/fuel ratio. The control adjusts the ignition timing of the engine to maintain engine speed and torque generally constant. The control also adjust the air/fuel ratio toward the desired predetermined air/fuel ratio.

The present invention includes a control which adjusts the ignition timing based on the current air/fuel ratio. When the current air/fuel ratio is within a lean air/fuel ratio range, the control advances the ignition timing if the predetermined air/fuel ratio is greater than the current air fuel ratio and delays the ignition timing if the predetermined air/fuel ratio is less than the current air fuel ratio. These adjustments occur as the control also adjusts the fuel and air ratio toward the predetermined air/fuel ratio for the then existing engine condition. When the current air/fuel ratio is within a rich air/fuel ratio range, the control advances the ignition timing if the predetermined air/fuel ratio is less than the current air fuel ratio and delays the ignition timing if the predetermined air/fuel ratio is greater than the current air fuel ratio, which the control adjusts the air/fuel ratio toward the predetermined ratio.

The present invention also includes an oxygen sensor positioned within a recess within the exhaust manifold or in the alternative a protective element positioned proximate the oxygen sensor.

BRIEF DESCRIPTION OF THE INVENTION

These and other features and advantages of the invention will become more apparent upon reading the following detailed description and with reference to the accompanying drawings of embodiments that exemplify the invention, in which.

DETAILED DESCRIPTION OF PREFERRED EMBODIMENTS OF THE INVENTION

Figure 1:
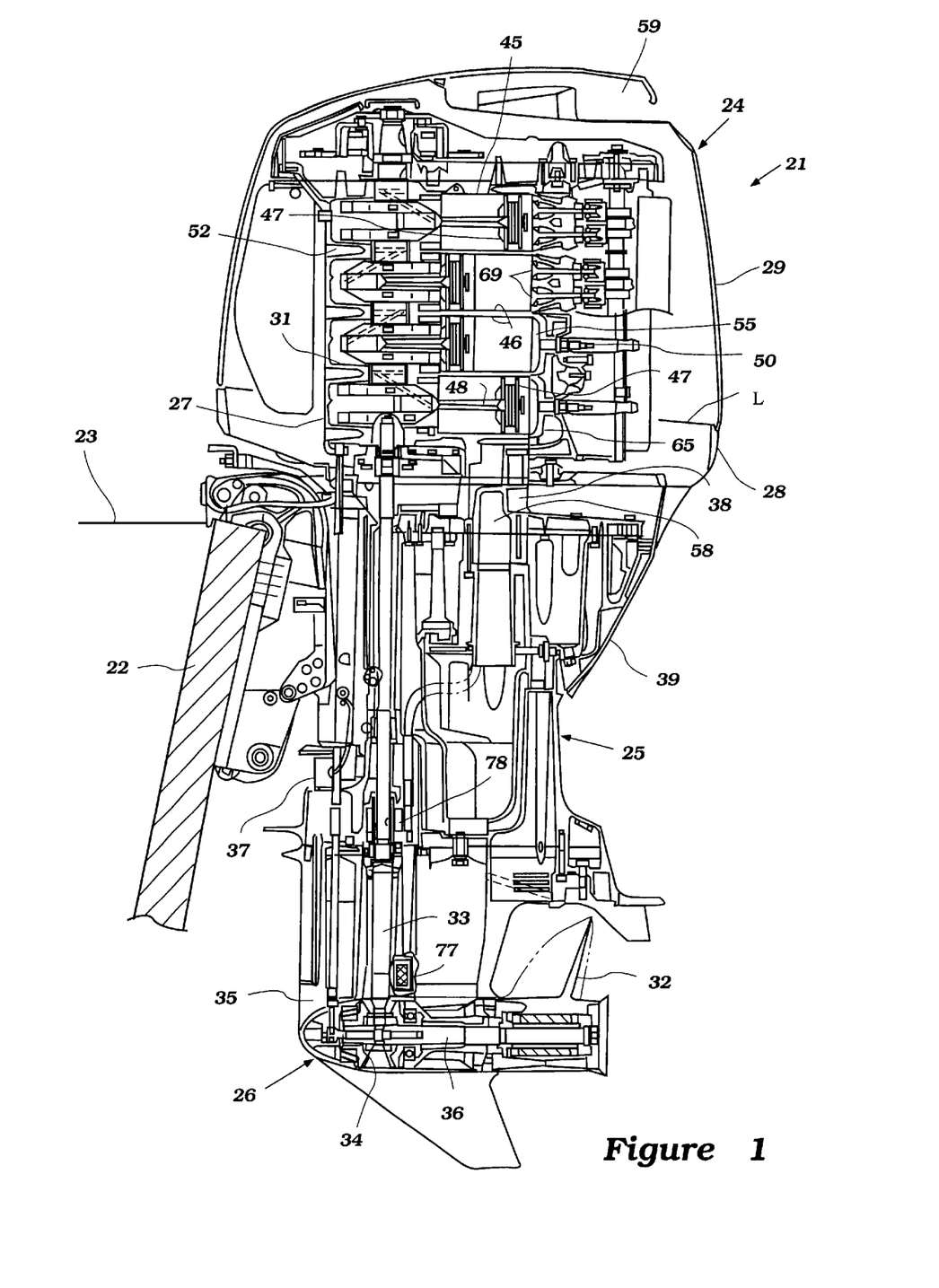
FIG. 1 is a side elevational view of an outboard motor that is typical for all of the embodiments of this invention and that is shown primarily in cross-section and attached to the transom of an associated watercraft (also shown partially in cross-section)
Figure 2:
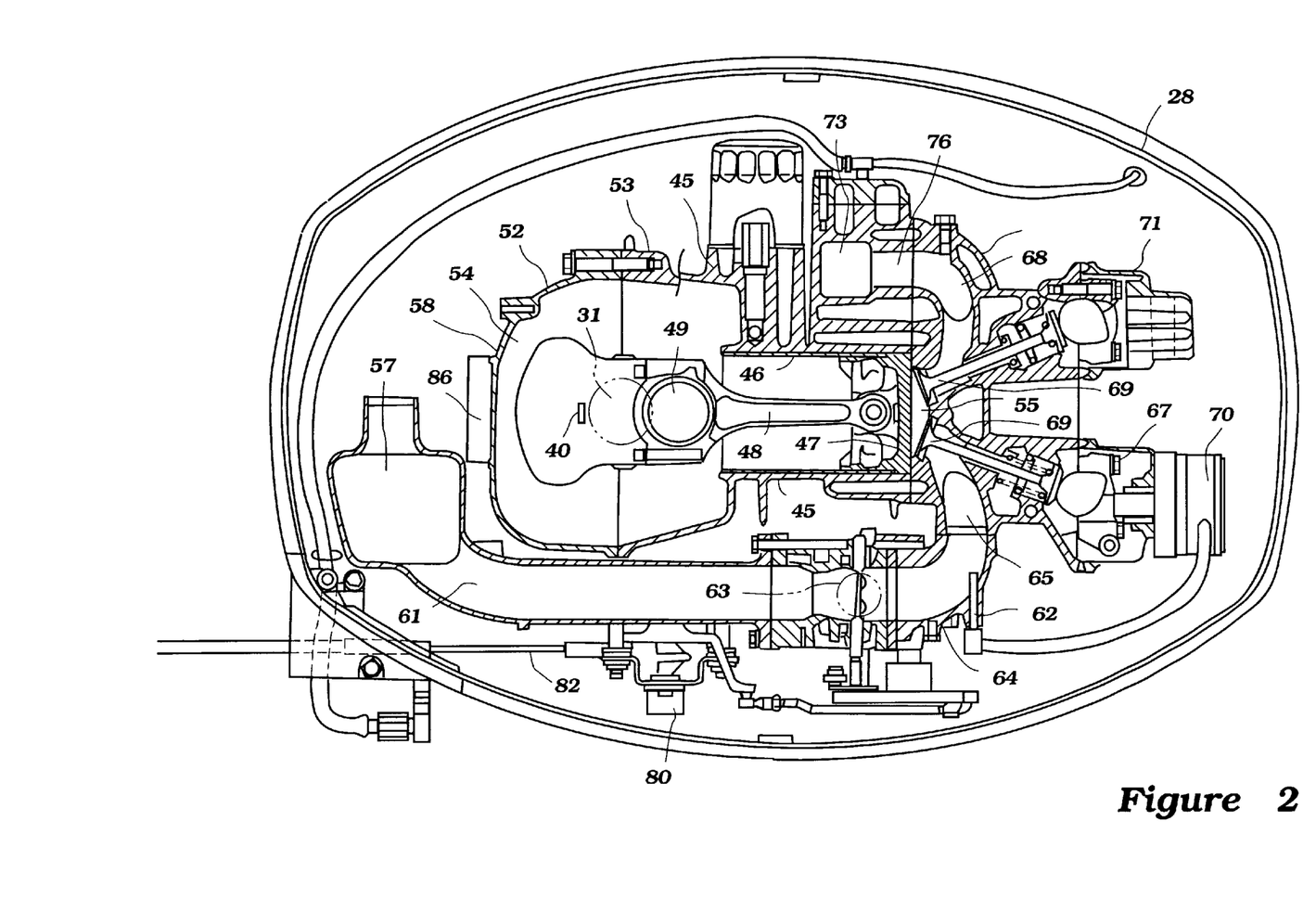
FIG. 2 is an enlarged top plan view of a powerhead of the outboard motor of FIG. 1 with a protective cowling of the powerhead removed and with an engine shown in cross-section.

With initial reference to FIGS. 1 and 2, an outboard motor which has a general construction that is typical for all of the embodiments disclosed herein is illustrated and is identified generally by the reference numeral 21. The outboard motor 21 is depicted as attached to a transom 22 of a watercraft which is shown partially and identified by the reference numeral 23.

The outboard motor 21 is comprised of a powerhead, indicated generally by the reference numeral 24; a drive shaft housing assembly, which depends from the powerhead 24 and which is identified generally by the reference numeral 25, and a lower unit, positioned at the lower end of the drive shaft housing 25 and indicated generally by the reference numeral 26.

The powerhead 24 contains a powering internal combustion engine 27 that is surrounded by a protective cowling. The cowling is comprised of a lower tray 28 and an upper main cowling member 29 that is detachably connected to the tray 28 so as to meet with one another at an interface line L (FIG. 1) in a suitable manner. As will become apparent and as is typical with outboard motor practice, the engine 27 is positioned in the powerhead 24 so that its crankshaft 31 rotates about a vertically extending axis. This is done so as to facilitate coupling of the crankshaft 31 to a transmission that is contained primarily within the drive shaft housing 25 and the lower unit 26 for driving a propulsion device supported by the lower unit 26. In the illustrated embodiment, this propulsion device includes a propeller 32.

The transmission is comprised primarily of a drive shaft 33 that has a splined connection at its upper end to the crankshaft 31. A bevel gear is carried on the lower end of the drive shaft 33 and drives a conventional bevel gear reversing transmission 34 that is contained within a transmission cavity of the housing 35 of the lower unit 26. This transmission selectively drives a propeller shaft 36 in forward or reserve directions. The propeller 32 is affixed to the propeller shaft 36.

A steering shaft (not shown) is affixed to the drive shaft housing assembly 25 by means including a lower bracket 37. The upper end of this steering shaft is connected to an exhaust guide, indicated generally by the reference numeral 38 and upon which the engine 27 is supported at the upper end of an outer housing 39 of the drive shaft housing assembly 25.

As seen in FIGS. 1 and 2, the internal combustion engine 27 that forms the prime mover for the powerhead 24 will now be described. In the illustrated embodiment, the engine 27 is of the four-cylinder, in-ine type and operates on a four-stroke principle. However, the present control system and oxygen sensor arrangement also can be used with an engine having any number of cylinders and operating on other combustion principles (e.g., on a two-stroke principle).

The engine 27 includes a cylinder block 45 in which four vertically spaced, horizontally extending cylinder bores 46 are formed. Pistons 47 are slidably supported within these cylinder bores 46 and are connected to the small ends of connecting rods 48 in a known manner. The big ends of the connecting rods are journaled on the throws of the crankshaft 31. The crankshaft 31 is rotatably journaled within a crankcase chamber 51 formed by a crankcase member 52 and a skirt portion 53 of the cylinder block 45 to which the crankcase member 52 is affixed in any suitable manner. An engine speed sensor 40 is attached to the crankshaft 31 and a control unit 86 is affixed to the crankcase chamber 51.

A cylinder head assembly, indicated generally by the reference numeral 54 is affixed to the end of the cylinder block 45 opposite to the crankcase member 52. The cylinder head assembly 54 has individual recesses 55 formed in its inner face, each of which cooperates with a respective one of the cylinder bores 46 and the heads of the pistons 47 to form the combustion chambers of the engine.

An induction system, indicated generally by the reference numeral 56 supplies a charge to these combustion chambers. This induction system 56 includes an air inlet device and silencer 57 which is mounted in the powerhead 24 at the forward end of the main cowling member 29 and in spaced relationship to a vertically extending, forward face 58 of the crankcase member 52. The air inlet and silencer device 57 draws atmospheric air from within the protective cowling 29. This air is admitted through a rearwardly facing air inlet opening 59 formed in the main cowling member 29.

A plurality of intake pipes 61 extend from the air inlet device 57 to individual throttle bodies. These throttle bodies include flow controlling throttle valves 63 for controlling the speed of the engine 27 in a manner well known in the art. These throttle bodies each cooperate with a respective intake manifold runner 64 that serves a cylinder head intake passage 65.

A throttle operator (not shown) is connected to the engine 27 by a throttle wire 82. As the throttle operator is moved, the throttle wire 82 adjusts a control device to vary the amount of air supplied to the engine 27. A throttle angle sensor 80 detects the position of the throttle valve.

An intake valve arrangement is mounted in the cylinder head assembly 54 and is operated by an intake camshaft arrangement 68 for opening and controlling the admission of a charge to the combustion chamber recesses 55 from the cylinder head intake passages 65. The intake camshaft 67 is driven at one-half crankshaft speed by any suitable timing drive.

Spark plugs 50 are mounted in the cylinder head assembly 54 and fire a charge that is delivered to the combustion chambers. These spark plugs 50 are fired by a suitable ignition system. In addition to the air charge which has been delivered, fuel is added to the combustion chambers by fuel injectors 62 to form the air-fuel mixture that is fired by the spark plugs 50. In the illustrated embodiment, the fuel injector are mounted onto the intake manifold and are arranged for indirect injection. The fuel injectors, however, can be arranged on the cylinder head for direct injection A fuel pump 70 of a fuel supply system supplies fuel to the fuel injectors 62. The balance of the fuel supply system is conventional and need not be described for an appreciation and understanding of the present control system.

The charge which has been burned in the engine combustion chambers is discharged therefrom through an exhaust passage arrangement 68 formed in the cylinder head assembly 54 on the side opposite the intake passage arrangement 65. An exhaust valve assembly, indicated generally by the reference numeral 69 and which is operated by an exhaust camshaft 71, is provided for controlling the communication of the combustion chambers with this exhaust passage arrangement 68. Like the intake camshaft 67, the exhaust camshaft 71 is driven by a suitable timing mechanism at one-half crankshaft speed.

The cylinder head exhaust passage arrangement 68 has a reentrant or U-shape and discharges into manifold runners 72 that are formed integrally (i.e., unitary) within the cylinder block 46 in a face that mates with the cylinder head assembly 54. These runners 72 serve an exhaust manifold 73 that extends vertically through the side of the cylinder block 53 and which terminates in a downwardly facing exhaust discharge passage.

This exhaust discharge passage communicates with an exhaust passage formed in the exhaust guide plate 54. This exhaust guide passage 74 communicates with an exhaust system 58 for discharging the exhaust gases from the engine 27 to the atmosphere. The remaining portion of the exhaust systems for the various embodiments are different from each other in certain regards. Therefore and since this initial description is of the common portion of the outboard motor 21, the remainder of the exhaust system will be described later in detail.

Water for cooling the engine 27 is taken from the body of water in which the watercraft 23 is operating through an underwater coolant inlet opening 77 formed in the lower unit housing 35. This water is drawn by a water pump 78 that is directly driven off of the drive shaft 33 at the interface between the housing 39 of the drive shaft housing assembly 25 and the housing 35 of the lower unit 26.

The structure of the outboard motor 21 as thus far described, is typical of all embodiments and may generally be assumed to be conventional. Therefore, where any components of the engine 27 or of the outboard motor 21 and its propulsion system have not been described, resort may be had to any conventional structure with which to practice the invention.

Figure 3:
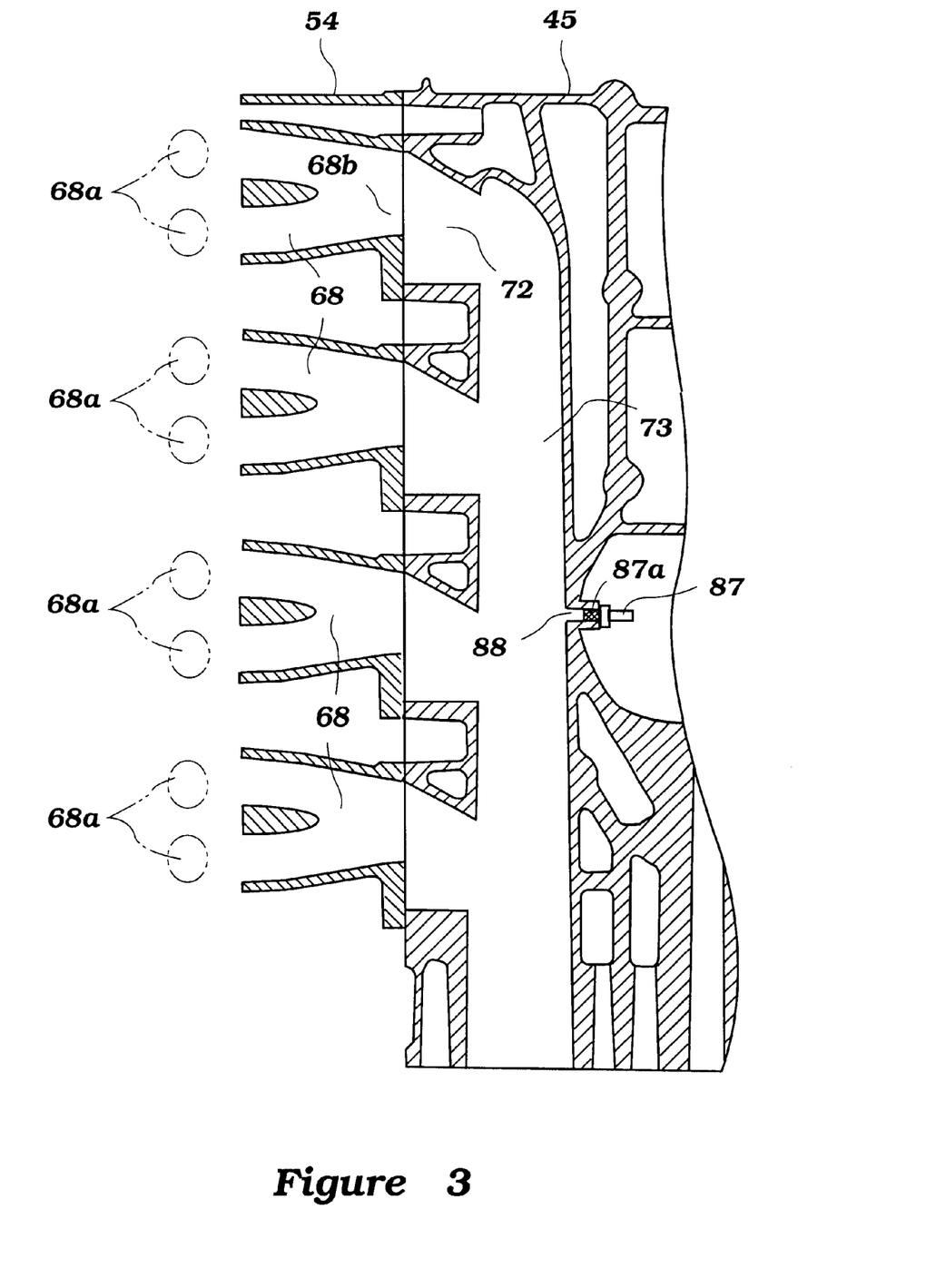
FIG. 3 is a cross-sectional view of a portion of the engine of FIG. 2 taken along line III—III and illustrated an oxygen sensor disposed in an exhaust passage in accordance with a preferred embodiment of the present invention.

FIG. 3 shows a cross-sectional view of the exhaust system of the engine 27. In the exhaust system, exhaust gases are expelled from the cylinder bores 46 through exhaust ports 68a. The exhaust gases pass through the exhaust passage arrangement 68, through openings 68b, to the manifold runners 72 in the exhaust manifold 73. The exhaust manifold 73 includes a recess 88 used to mount an $O_2$ sensor 87. As seen in FIG. 3, a sensor element 87a is located within the recess 88. By positioning the $O_2$ sensor 87 entirely within the recess 88, the $O_2$ sensor 87 is protected from damage from water that may flow back toward the combustion chamber from the propeller and upwardly into the exhaust manifold 73 when the engine 27 backfires. The $O_2$ sensor 87 detects an oxygen concentration of the combustion gas to determine the current air/fuel ratio.

Figure 4:
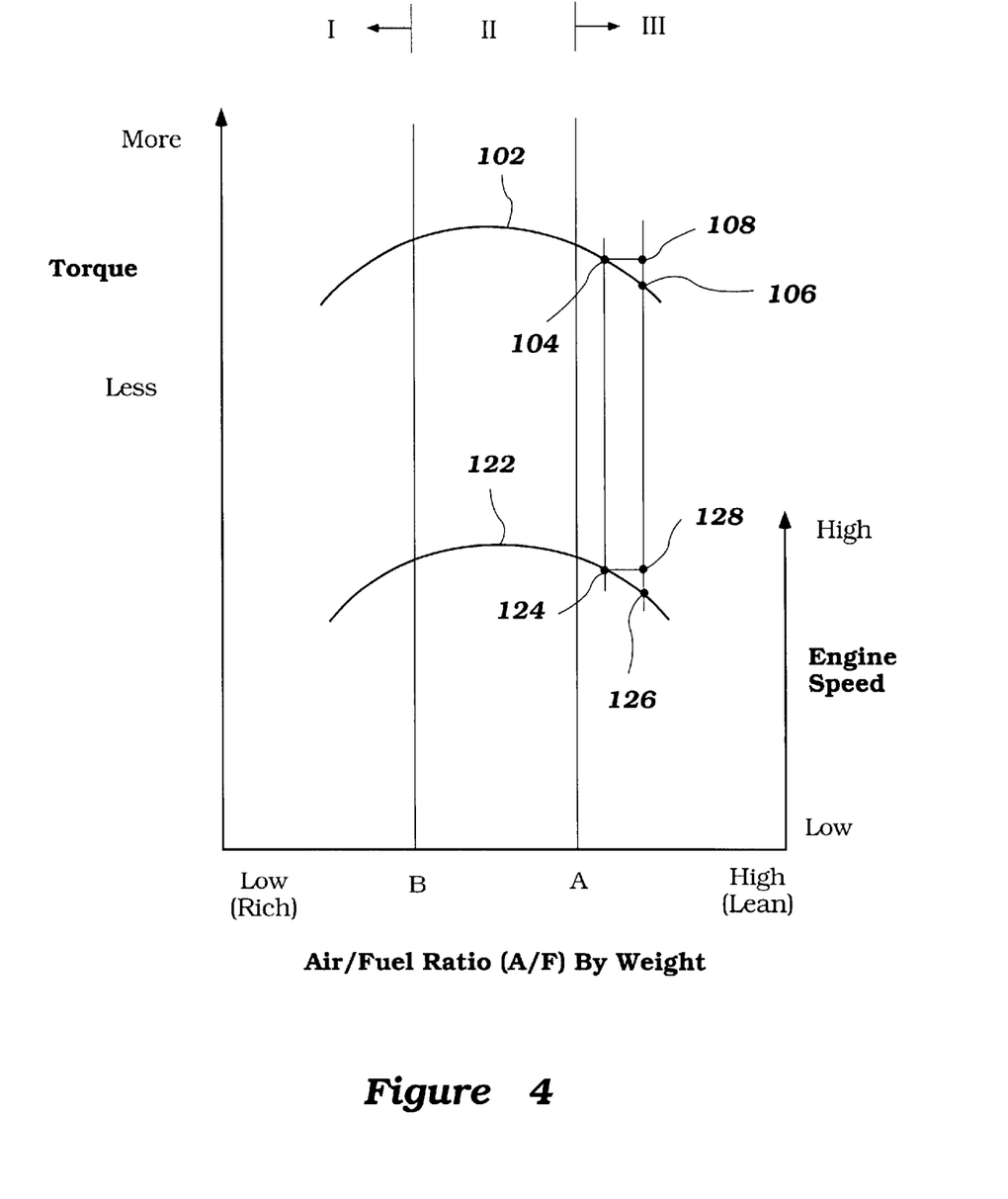
FIG. 4 is a graph showing the affect of the air/fuel ratio on both engine torque and engine speed.

FIG. 4 shows the effect of the air/fuel ratio on both engine torque and engine speed. The graph of FIG. 4 is divided into three ranges. Range I contains low air/fuel ratios, or rich mixtures. Range II contains air/fuel ratios generally approximating a Stoichiometric ratio. Range III contains high air/fuel ratios, or lean mixtures. The torque of the engine over these ranges is shown by line 102, and the speed of the engine over these ranges is indicated by line 122 for a specific ignition timing.

When the air/fuel ratio is generally about the Stoichiometric ratio (Range II of the graph), both the engine torque 102 and engine speed 122 are relatively unaffected by minor changes in the air/fuel ratio. However, when the air/fuel ratio is either rich (Range I) or lean (Range III), small changes in the air/fuel ratio cause significant changes in both engine torque 102 and engine speed 122. For example, when the air/fuel ratio is lean, a first air/fuel ratio produces the engine's current torque 104 and speed 124. If the air/fuel ratio is then increased, so as to move toward a desired predetermined air/fuel ratio, the torque normally decreases, as indicated by point 106 on the engine torque line 102, and the engine's speed also decreases, as indicated by point 126 on the engine speed line 122. To maintain the same engine torque and speed at the new air/fuel ratio, the ignition timing can be changed. Therefore, by increasing the ignition timing, the engine torque is increased to a new level 108 and the engine speed is increased to a level 128. The process works in reverse in section I of the graph.

Figure 5:
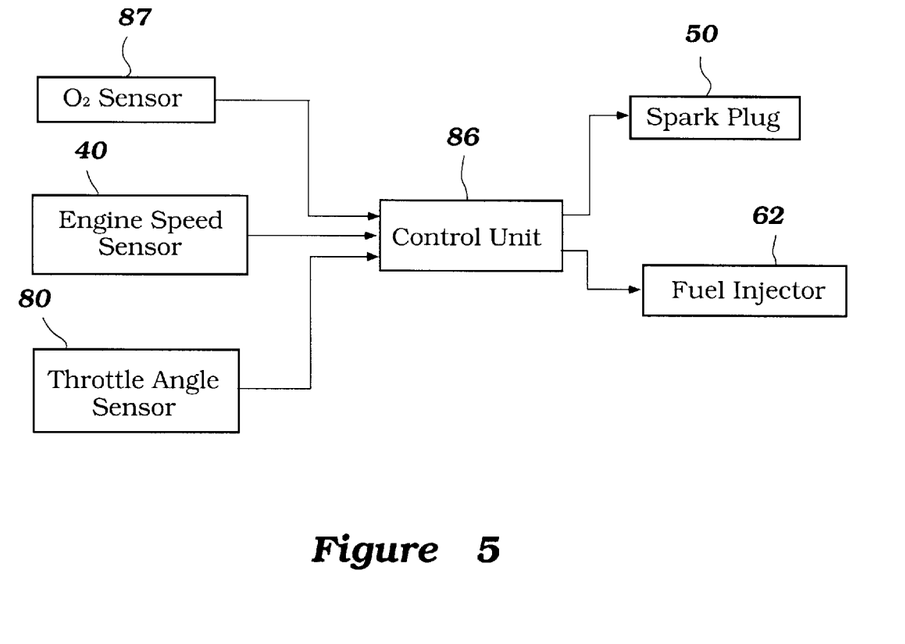
FIG. 5 is a flowchart showing inputs received by and the outputs controlled by a control unit according to one aspect of the present invention.

The control unit 86 of the present control system may be embodied in a microprocessor. FIG. 5 shows the control unit 86 receives inputs from the $O_2$ sensor 87, the engine speed sensor 40, and the throttle angle sensor 80. The control unit 86 includes a database or map of predetermined air/fuel ratios based upon the inputs from the engine speed sensor 40 and the throttle angle sensor 80. This database or map is stored in memory and can be retrieved and read. If the air/fuel ratio from the $O_2$ sensor 87 does not match the predetermined value, the control unit 86 adjusts the air/fuel ratio toward the predetermined ratio. However, in order to maintain a generally constant speed and torque, the control unit 86 also changes the ignition timing in a known manner.

Figure 6:
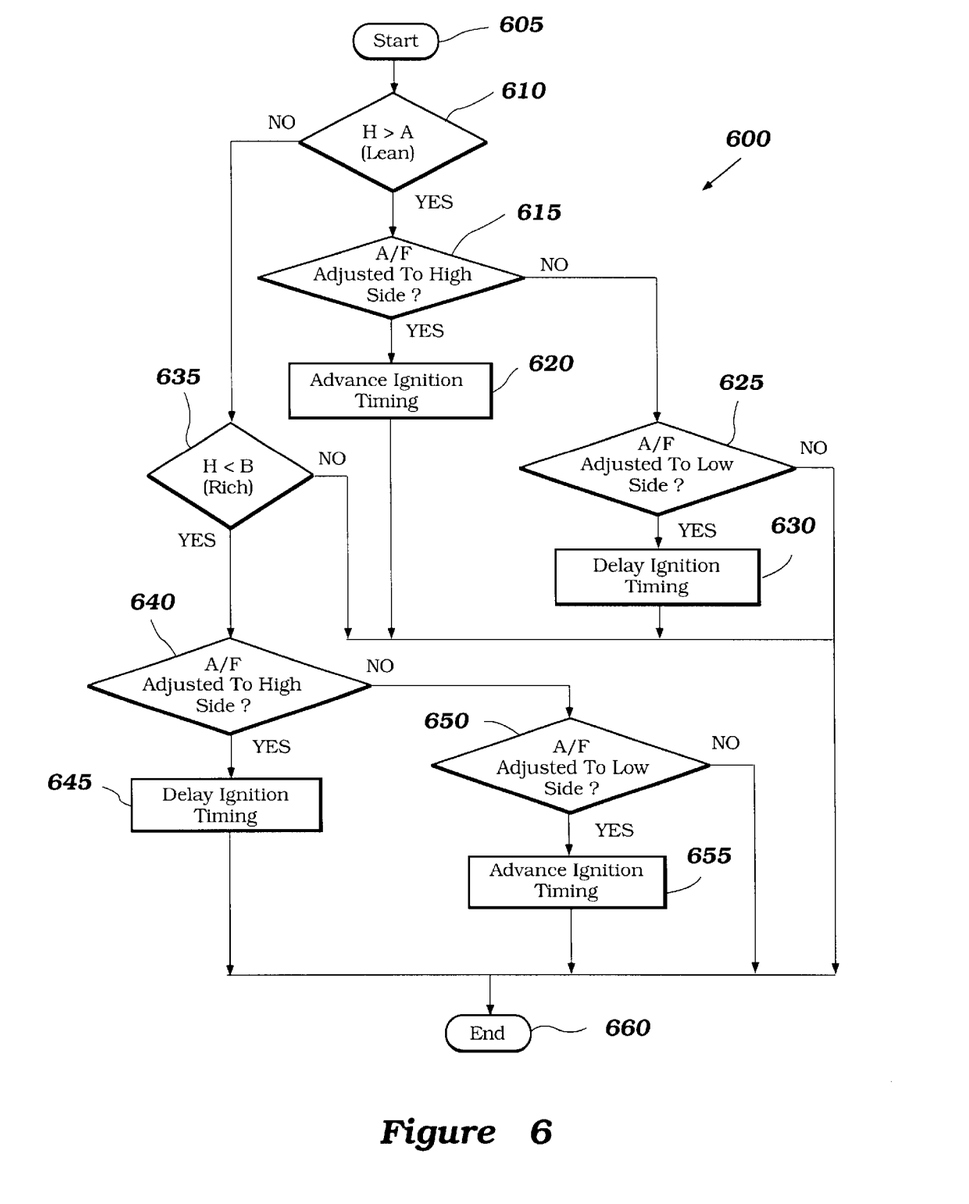
FIG. 6 is a flowchart showing the logic the control unit performs to adjust the engine inputs.

FIG. 6 is a flowchart 600 showing the logic the control unit 86 uses to maintain a constant engine speed and torque. The process begins at start state 605. Proceeding to state 610, the air/fuel ratio is checked using the $O_2$ sensor 87 to determine if the mixture is lean (i.e., within the lean air/fuel ratio range—Range III). If the mixture is lean, the control unit 86 proceeds to state 615 and compares the detected air/fuel ratio to the predetermined air/fuel ratio according to then existing engine conditions (e.g., engine speed, throttle valve opening degree) using the database. If the air/fuel ratio is high (i.e., excessively lean), the process proceeds to state 620 and advances the ignition timing to maintain a constant engine speed and torque while the ratio of air and fuel is adjusted toward the predetermined ratio.

Returning to state 615, if the air/fuel ratio is not high, the process proceeds to state 625 to determine if the detected air/fuel ratio is low compared to the predetermined ratio. If the air/fuel ratio is low, the process proceed to state 630 and delays the ignition timing to maintain a constant engine speed and torque. The routine is then complete and repeats. If the air/fuel ratio is not low, ignition timing is left unchanged and the engine speed and torque should be generally constant. The routine completes at state 660 and repeats.

Returning to state 610, if the mixture is not lean (not within the lean air/fuel ratio range), the process proceeds to state 635 and determines whether the mixture is rich (i.e., the air/fuel ratio is excessively low). If the mixture is not rich, the engine is running in Range II of the graph of FIG. 4 where changes in the air/fuel ratio do not substantially affect the engine speed and torque, so the process completes at state 660 and repeats. At this time, the air/fuel ratio can be adjusted toward the predetermined air/fuel ratio without adjusting ignition timing.

If the mixture is rich (i.e., the determined air/fuel ratio is within the rich air/fuel ratio range—Range I), the process proceeds to state 640 and compares the detected air/fuel ratio with the predetermined air/fuel ratio according to the database. If the air/fuel ratio is high (i.e., leaner than the predetermined air/fuel ratio), the process proceeds to state 645 and the control unit delays ignition timing to maintain a constant engine speed and torque.

Returning to state 640, if the air/fuel ratio is not high, the process proceeds to state 650 to determine if the detected air/fuel ration is low compared to the predetermined level (i.e., richer than the predetermined air/fuel ratio). If the air/fuel ratio is low, the process proceed to state 655 and advances the ignition timing to maintain a constant engine speed and torque. The routine is then complete and repeats. If the air/fuel ratio is not low, the engine speed and torque should be constant as the air/fuel ratio need not be adjusted, and the routine completes at state 660 and repeats.

Figure 7:
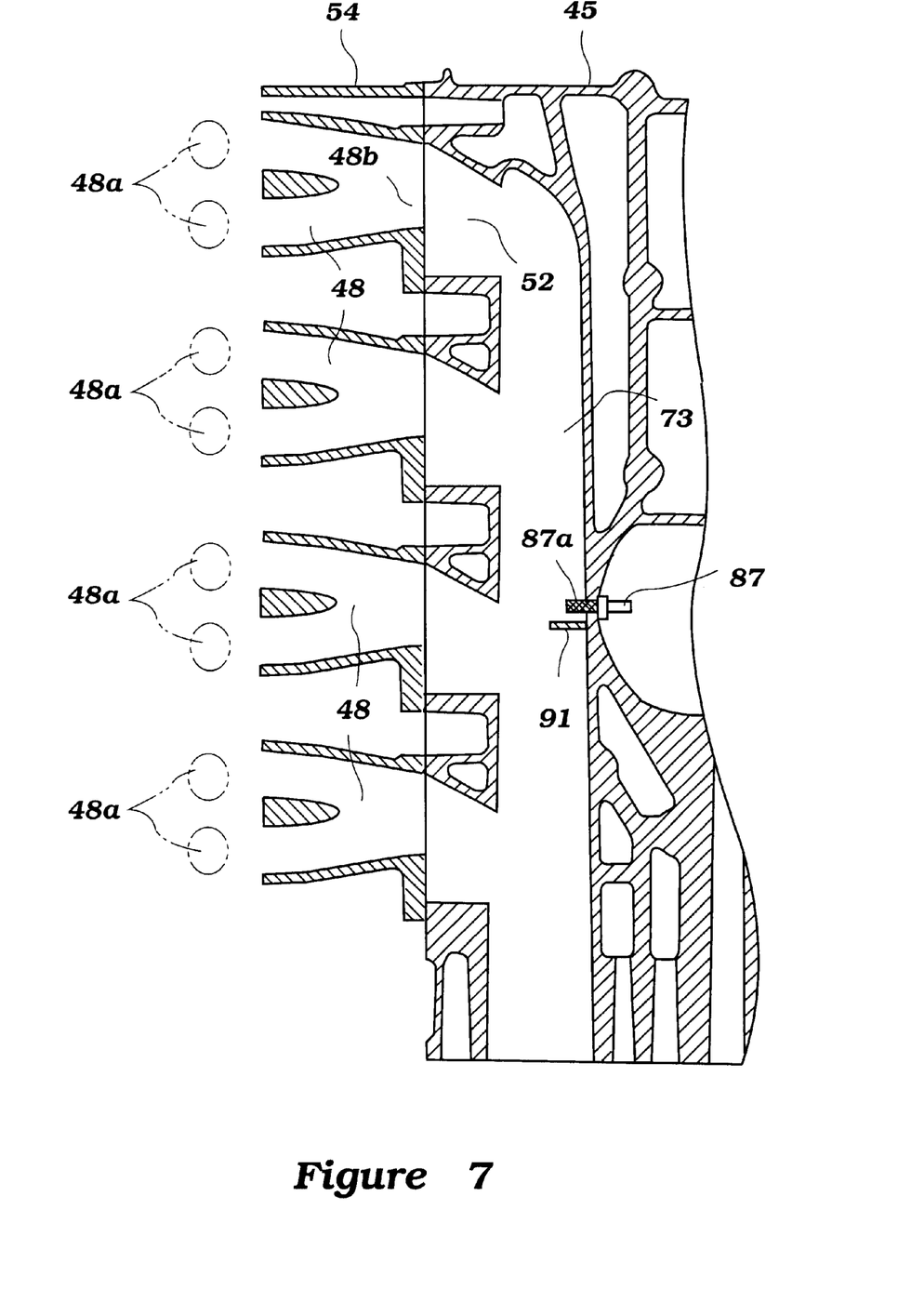
FIG. 7 is a cross-sectional view of a portion of the engine of FIG. 2 taken along line III—III and illustrates an oxygen sensor disposed within an exhaust passage in accordance with another preferred embodiment of the present invention.

FIG. 7 shows a cross-sectional view of the exhaust system of the engine 27 according to an additional embodiment of the present invention. In this embodiment of the invention, the $O_2$ sensor 87 extends into the exhaust manifold 73. However, the exhaust manifold 73 includes a protective element 91 positioned in front of the $O_2$ sensor. The protective element 91 protects the O₂ sensor 87 from water that may flow back toward the combustion chamber from the propeller and upwardly into the exhaust manifold 73 when the engine 27 backfires.

Numerous variations and modifications of the invention will become readily apparent to those skilled in the art. Accordingly, the invention may be embodied in other specific forms without departing from its spirit or essential characteristics. The detailed embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. An internal combustion engine comprising at least one combustion chamber defined by at least a first component and a second component that moves relative to the first component, an ignition device operated by an ignition system and disposed relative to the combustion chamber so as to selectively ignite an air/fuel charge within the combustion chamber, a charge former communicating with the combustion chamber to supply fuel to the combustion chamber, a throttle device regulating air flow into the combustion chamber, and an engine feedback control system including a controller and a sensory system, the controller connected to the sensory system to receive signals indicative of then existing engine conditions and air/fuel ratios of air/fuel charges within the combustion chamber, the controller communicating with and controlling the operation of the charge former and the ignition system, the controller configured to determine a sensed air/fuel ratio and to compare the sensed air/fuel ratio with a predetermined air/fuel ratio for a then existing engine condition, the controller further configured to determine whether the sensed air/fuel ratio is greater than a threshold air/fuel ratio that is predetermined so that the sensed air/fuel ratio falls within a lean air/fuel ratio range, and if so, to increase the air/fuel ratio and to advance ignition timing if the predetermined air/fuel ratio is greater than the sensed air/fuel ratio, and to decrease the air/fuel ratio and to delay ignition timing if the predetermined air/fuel ratio is less than the sensed air/fuel ratio.

2. An internal combustion engine as in claim 1, wherein the sensory system includes an air flow volume sensor, an engine speed sensor and an oxygen sensor which communicates with an exhaust passage that receives exhaust gases from the combustion chamber, and the controller is connected to the sensors to receive signals indicative of air flow volume into the combustion chamber, engine speed, and air/fuel ratio of the air/fuel charge present in the combustion chamber prior to ignition.

3. An internal combustion engine as in claim 2, wherein the controller includes memory in which a map of predetermined air/fuel ratios for specific engine speeds and air flow volumes is stored.

4. An internal combustion engine as in claim 2, wherein the exhaust passage forms a portion of an exhaust manifold of the engine, and the oxygen sensor is disposed within a recess within the exhaust manifold with a sensor element of the oxygen sensor located within the recess.

5. An internal combustion engine as in claim 2, wherein the exhaust passage forms a portion of an exhaust manifold of the engine, and wherein the oxygen sensor is disposed within a recess within the exhaust manifold with a sensor element of the oxygen sensor extending into the passage, and a protective shield shields at least a portion of the sensor element, the protective shield being connected to the exhaust manifold.

6. An internal combustion engine as in claim 2, wherein the air flow volume sensor includes a throttle position sensor.

7. An internal combustion engine as in claim 1 additionally comprising an intake passage extending between the combustion chamber and the throttle device, and the charge former is arranged to introduce fuel into an air flow through the intake passage.

8. An internal combustion engine as in claim 7 additionally comprising a valve mechanism that selectively regulates delivery of the air/fuel charge into the combustion chamber.

9. An internal combustion engine comprising at least one combustion chamber defined by at least a first component and a second component that moves relative to the first component, an ignition device operated by an ignition system and disposed relative to the combustion chamber so as to selectively ignite an air/fuel charge within the combustion chamber, a charge former communicating with the combustion chamber to supply fuel to the combustion chamber, a throttle device regulating air flow into the combustion chamber, and an engine feedback control system including a controller and a sensory system, the controller connected to the sensory system to receive signals indicative of then existing engine conditions and air/fuel ratios of air/fuel charges within the combustion chamber, the controller communicating with and controlling the operation of the charge former and the ignition system, the controller configured to determine a sensed air/fuel ratio and to compare the sensed air/fuel ratio with a predetermined air/fuel ratio for a then existing engine condition, the controller further configured to determine whether the sensed air/fuel ratio is within a lean air/fuel ratio range, and if so, to increase the air/fuel ratio and to advance ignition timing if the predetermined air/fuel ratio is greater than the sensed air/fuel ratio, and to decrease the air/fuel ratio and to delay ignition timing if the predetermined air/fuel ratio is less than the sensed air/fuel ratio, the controller additionally configured to determine whether the sensed air/fuel ratio is within a rich air/fuel ratio range, and if so, to decrease the air/fuel ratio and to advance ignition timing if the predetermined air/fuel ratio is greater than the sensed air/fuel ratio, and to increase the air/fuel ratio and to delay ignition timing if the predetermined air/fuel ratio is less than the sensed air/fuel ratio.

10. An internal combustion engine as in claim 9, wherein the controller additionally is configured to determine whether the sensed air/fuel ratio is within an intermediate air/fuel ratio range, which is between the lean and rich air/fuel ratio ranges, and if so, to leave ignition timing unchanged.

11. An internal combustion engine as in claim 10, wherein the controller determines whether the sensed air/fuel ratio is less than a first threshold air/fuel ratio that is predetermined and is greater than a second threshold air/fuel ratio that is also predetermined so that the sensed air/fuel ratio falls within the lean and rich air/fuel ratio ranges.

12. An internal combustion engine as in claim 9, wherein the controller determines whether the sensed air/fuel ratio is greater than a threshold air/fuel ratio that is predetermined so that the sensed air/fuel ratio falls within the lean air/fuel ratio range.

13. An internal combustion engine as in claim 12, wherein the controller determines whether the sensed air/fuel ratio is less than a second threshold air/fuel ratio that is predetermined so that the sensed air/fuel ratio falls within the rich air/fuel ratio range, and the second threshold air/fuel ratio is less than the first threshold air/fuel ratio.

14. An internal combustion engine as in claim 9, wherein the controller determines whether the sensed air/fuel ratio is less than a threshold air/fuel ratio that is predetermined so that the sensed air/fuel ratio falls within the rich air/fuel ratio range.

15. An internal combustion engine comprising at least one combustion chamber defined by at least a first component and a second component that moves relative to the first component, an ignition device operated by an ignition system and disposed relative to the combustion chamber so as to selectively ignite an air/fuel charge within the combustion chamber, a charge former communicating with the combustion chamber to supply fuel to the combustion chamber, a throttle device regulating air flow into the combustion chamber, and an engine feedback control system including a controller and a sensory system, the controller connected to the sensory system to receive signals indicative of then existing engine conditions and air/fuel ratios of air/fuel charges within the combustion chamber, the controller communicating with and controlling the operation of the charge former and the ignition system, the controller configured to determine a sensed air/fuel ratio and to compare the sensed air/fuel with a predetermined air fuel ratio for a then existing engine condition, the controller further configured to determine whether the sensed air/fuel ratio is within a rich air/fuel ratio range, and if so, to decrease the air/fuel ratio and to advance ignition timing if the predetermined air/fuel ratio is greater than the sensed air/fuel ratio, and to increase the air/fuel ratio and to delay ignition timing if the predetermined air/fuel ratio is less than the sensed air/fuel ratio.

16. An internal combustion engine as in claim 15, wherein the controller additionally is configured to determine whether the sensed air/fuel ratio is within a second air/fuel ratio range, which range includes a stoichiometric air/fuel ratio, and if so, to leave ignition timing unchanged.

17. An internal combustion engine as in claim 16, wherein the controller determines whether the sensed air/fuel ratio is greater than a threshold air/fuel ratio that is predetermined so that the sensed air/fuel ratio falls within the second air/fuel ratio range.

18. An internal combustion engine as in claim 15, wherein the controller determines whether the sensed air/fuel ratio is less than a threshold air/fuel ratio that is predetermined so that the sensed air/fuel ratio falls within the rich air/fuel ratio range.

19. An internal combustion engine having a body defining at least one combustion chamber, an air intake system providing air to the combustion chamber, a fuel delivery system providing fuel to the combustion chamber, an exhaust passage leading from the combustion chamber so as to route exhaust gases away from the combustion chamber, and an engine feedback control system comprising means for determining an air/fuel ratio of an air/fuel charge within the combustion chamber, means for comparing the determined air/fuel ratio with a predetermined air/fuel ratio for a then existing running condition of the engine, means for comparing the determined air/fuel ratio with first and second threshold air/fuel ratios that are predetermined, the first threshold air/fuel ratio being greater than the second threshold air/fuel ratio, means for adjusting the ratio of air and fuel supplied to the combustion chamber toward the predetermined air/fuel ratio, and means for maintaining the engine at a generally constant speed as the ratio of air and fuel are adjusted when the determined air/fuel ratio is greater than the first threshold air/fuel ratio or when the determined air/fuel ratio is less than the second threshold air/fuel ratio.

20. A method for operating an internal combustion engine comprising at least one variable volume combustion chamber defined by first and second components that move relative to each other, a throttle device communicating with the combustion chamber, a fuel supply system that supplies fuel to the combustion chamber and an igniter at least partially disposed within the combustion chamber to ignite an air/fuel charge, the method comprising sensing a ratio of air to fuel within the air/fuel charge and the running condition of the engine, comparing the sensed air/fuel ratio with a predetermined air/fuel ratio for the then existing running condition of the engine, determining whether the sensed air/fuel ratio is greater than a threshold air/fuel ratio that is predetermined so that the sensed air/fuel ratio falls within a lean air/fuel ratio range, and if so, increasing the air/fuel ratio and advancing ignition timing if the predetermined air/fuel ratio is greater than the sensed air/fuel ratio, and decreasing the air/fuel ratio and delaying ignition timing if the predetermined air/fuel ratio is less than the sensed air/fuel ratio.

21. A method for operating an internal combustion engine comprising at least one variable volume combustion chamber defined by first and second components that move relative to each other, a throttle device communicating with the combustion chamber, a fuel supply system that supplies fuel to the combustion chamber and an igniter at least partially disposed within the combustion chamber to ignite an air/fuel charge, the method comprising sensing a ratio of air to fuel within the air/fuel charge and the running condition of the engine, comparing the sensed air/fuel ratio with a predetermined air/fuel ratio for the then existing running condition of the engine, determining whether the sensed air/fuel ratio is within a lean air/fuel ratio range, and if so, increasing the air/fuel ratio and advancing ignition timing if the predetermined air/fuel ratio is greater than the sensed air/fuel ratio, and decreasing the air/fuel ratio and delaying ignition timing if the predetermined air/fuel ratio is less than the sensed air/fuel ratio, determining whether the sensed air/fuel ratio is within a rich air/fuel ratio range, and if so, decreasing the air/fuel ratio and advancing ignition timing if the predetermined air/fuel ratio is greater than the sensed air/fuel ratio, and increasing the air/fuel ratio and delaying ignition timing if the predetermined air/fuel ratio is less than the sensed air/fuel ratio.

22. A method as in claim 21 additionally involving determining whether the sensed air/fuel ratio is within an intermediate air/fuel ratio range, which is between the lean and rich air/fuel ratio ranges, and if so, leaving ignition timing unchanged.

23. An outboard motor engine situated above an exhaust guide through which engine exhaust gases are discharged, the engine comprising a cylinder block and a cylinder head closing an end of the cylinder block and defining a plurality of exhaust ports, the cylinder block defining an exhaust manifold communicating with the exhaust ports and extending to the exhaust guide to deliver the engine exhaust gases to the exhaust guide, a recess formed in the exhaust manifold, and an oxygen sensor disposed at the recess with a sensor element of the oxygen sensor being located within the recess.

24. An outboard motor engine of claim 23, wherein the engine is covered by upper and lower cowling members, and the oxygen sensor is located higher than an interface line between the upper and lower cowling members.

25. An outboard motor engine situated above an exhaust guide through which engine exhaust gases are discharged, the engine comprising a cylinder block and a cylinder head closing an end of the cylinder block and defining a plurality of exhaust ports, the cylinder block defining an exhaust manifold communicating with the exhaust ports and extending to the exhaust guide to deliver the engine exhaust gases to the exhaust guide, a recess formed in the exhaust manifold, and an oxygen sensor disposed at the recess with a sensor element of the oxygen sensor extending into a passage of the exhaust manifold, and a protective shield shielding at least a portion of the sensor element, the protective shield being connected to the exhaust manifold.

26. An outboard motor engine of claim 25, wherein the engine is covered by upper and lower cowling members, and the oxygen sensor is located higher than an interface line between the upper and lower cowling members.

27. A method for operating an internal combustion engine comprising at least one variable volume combustion chamber defined by first and second components that move relative to each other, a throttle device communicating with the combustion chamber, a fuel supply system that supplies fuel to the combustion chamber and an igniter at least partially disposed within the combustion chamber to ignite an air/fuel charge, the method comprising sensing a ratio of air to fuel within the air/fuel charge and the running condition of the engine, comparing the sensed air/fuel ratio with a predetermined air/fuel ratio for the then existing running condition of the engine, determining whether the sensed air/fuel ratio is within a rich air/fuel ratio range, and if so, decreasing the air/fuel ratio and advancing ignition timing if the predetermined air/fuel ratio is greater than the sensed air/fuel ratio, and increasing the air/fuel ratio and delaying ignition timing if the predetermined air/fuel ratio is less than the sensed air/fuel ratio.

28. A method for operating an internal combustion engine comprising sensing an air/fuel ratio, comparing said sensed air/fuel ratio to a preset air/fuel ratio determined according to engine operating conditions, adjusting an actual air/fuel ratio if said sensed air/fuel ratio differs from said preset air/fuel ratio, determining whether said sensed air/fuel ratio is within a range of air/fuel ratios approximating a stoichiometric ratio, if said sensed air/fuel ratio is not within said range of air/fuel ratios approximating a stoichiometric ratio then also adjusting an ignition timing of the engine if said sensed air/fuel ratio differs from said preset air/fuel ratio.

29. The method of claim 28, wherein said actual air/fuel ratio is increased by decreasing an amount of fuel relative to an amount of air when said sensed air/fuel ratio is less than said preset air/fuel ratio.

30. The method of claim 28, wherein said actual air/fuel ratio is decreased by increasing an amount of fuel relative to an amount of air when said sensed air/fuel ratio is greater than said preset air/fuel ratio.

31. The method of claim 28, wherein said timing is advanced if said sensed air/fuel ratio is greater than said preset air/fuel ratio.

32. The method of claim 28, wherein said timing is delayed if said sensed air/fuel ratio is less than said preset air/fuel ratio.

* * * * *